United States Patent
Olliges

(10) Patent No.: US 8,876,202 B2
(45) Date of Patent: Nov. 4, 2014

(54) BERTH SLEEPER SYSTEM

(75) Inventor: Michael J. Olliges, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 1080 days.

(21) Appl. No.: 12/504,147

(22) Filed: Jul. 16, 2009

(65) Prior Publication Data

US 2011/0011977 A1   Jan. 20, 2011

(51) Int. Cl.
  *B60N 2/34* (2006.01)
  *B64D 11/06* (2006.01)

(52) U.S. Cl.
  CPC ........ *B64D 11/06* (2013.01); *B64D 2011/0658* (2013.01)
  USPC ...... 297/65; 297/344.21; 297/341; 244/118.6

(58) Field of Classification Search
  USPC ............. 297/65, 63, 118, 344.21, 283.1, 343, 297/354.13, 344.24; 244/122 R, 118.5, 244/118.6
  See application file for complete search history.

(56) References Cited

U.S. PATENT DOCUMENTS

| | | | | |
|---|---|---|---|---|
| 1,470,004 | A * | 10/1923 | Gahm | 297/326 |
| 2,348,407 | A * | 5/1944 | O'Neill | 297/67 |
| 5,790,997 | A * | 8/1998 | Ruehl | 5/618 |
| 5,954,401 | A * | 9/1999 | Koch et al. | 297/354.13 |
| 6,170,786 | B1 * | 1/2001 | Park et al. | 248/274.1 |
| 6,305,644 | B1 * | 10/2001 | Beroth | 244/118.5 |
| 6,669,141 | B2 * | 12/2003 | Schmidt-Schaeffer | 244/118.6 |
| 6,688,691 | B2 * | 2/2004 | Marechal et al. | 297/317 |
| 6,692,069 | B2 * | 2/2004 | Beroth et al. | 297/118 |
| 7,156,462 | B2 * | 1/2007 | Verny et al. | 297/354.13 |
| 7,178,871 | B1 * | 2/2007 | Round et al. | 297/244 |
| 7,185,951 | B2 * | 3/2007 | Johnson et al. | 297/343 |
| 7,213,882 | B2 * | 5/2007 | Dryburgh et al. | 297/354.13 |
| 7,419,214 | B2 * | 9/2008 | Plant | 297/245 |
| D583,579 | S * | 12/2008 | Pearson et al. | D6/356 |
| 7,721,991 | B2 | 5/2010 | Johnson | |
| 8,011,723 | B2 * | 9/2011 | Park et al. | 297/118 |
| 8,262,163 | B2 * | 9/2012 | Wu | 297/343 |
| 2001/0015566 | A1 * | 8/2001 | Park et al. | 297/115 |
| 2002/0017810 | A1 * | 2/2002 | Dryburgh et al. | 297/354.13 |
| 2002/0070314 | A1 * | 6/2002 | Schmidt-Schaeffer | 244/118.6 |

(Continued)

FOREIGN PATENT DOCUMENTS

EP    1211176    6/2002
WO   WO2007/070027   *   6/2007

(Continued)

OTHER PUBLICATIONS

European Search Report, European Application No. 10150908.1 (Oct. 20, 2010).

*Primary Examiner* — David R Dunn
*Assistant Examiner* — Richard Lowry
(74) *Attorney, Agent, or Firm* — John A. Lepore

(57) ABSTRACT

A berth sleeper system including a platform portion and a seat portion, the seat portion defining an axis of rotation and being rotatable relative to the platform portion about the axis of rotation, wherein the seat portion includes a seat base, a backrest and a recline mechanism, the recline mechanism supporting the seat base and the backrest in an upright configuration and a horizontal configuration, wherein the seat base is substantially co-planar with the platform portion, while the backrest is disposed at an angle relative to the seat base in the upright configuration, and wherein the seat base and the backrest are substantially co-planar with the platform portion in the horizontal configuration.

19 Claims, 5 Drawing Sheets

(56) References Cited

U.S. PATENT DOCUMENTS

2008/0088160 A1* 4/2008 Johnson .................. 297/240
2009/0302158 A1* 12/2009 Darbyshire et al. ....... 244/118.6
2010/0193634 A1* 8/2010 Hankinson et al. ....... 244/118.6

FOREIGN PATENT DOCUMENTS

| WO | WO 2007/072045 | * | 6/2007 |
| WO | 2008/046027 | | 4/2008 |
| WO | WO 2008/122761 | * | 10/2008 |

* cited by examiner

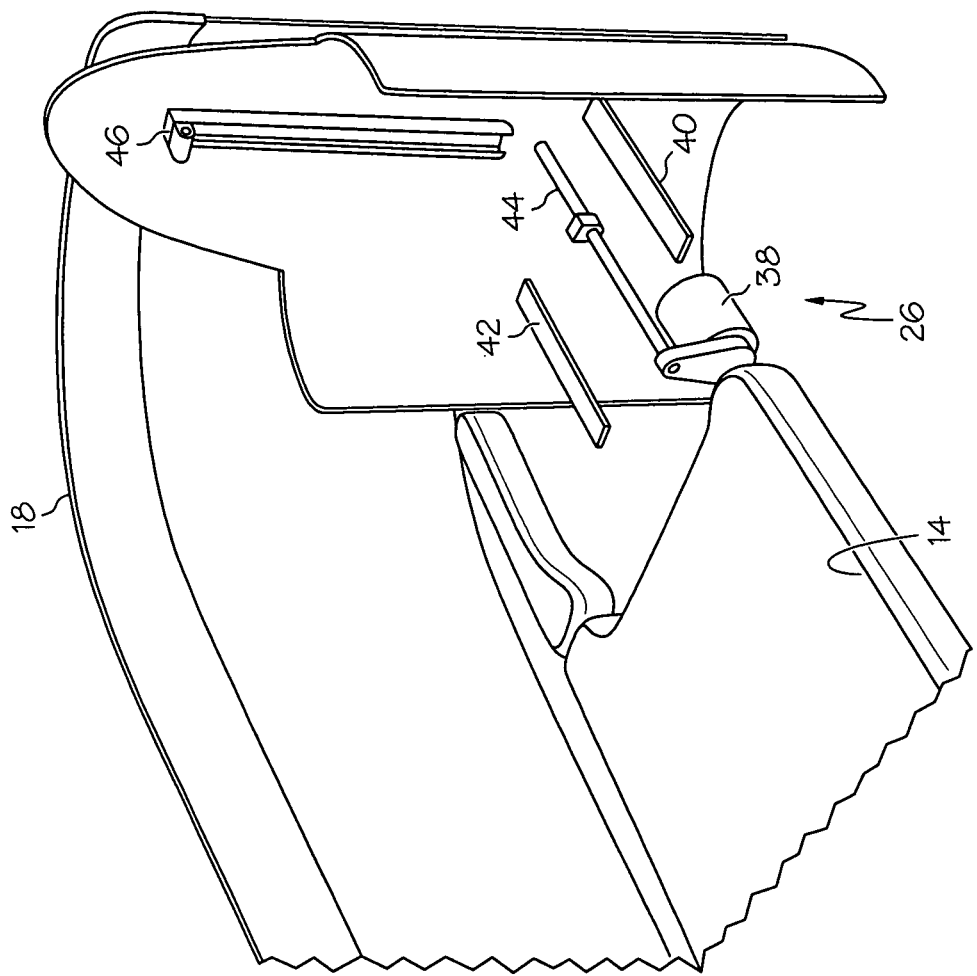

BERTH SLEEPER SYSTEM

FIELD

The present patent application relates to berth sleeper systems and, more particularly, to berth sleeper systems for aircraft and the like that are convertible from an upright, sitting configuration to a horizontal, sleeping configuration.

BACKGROUND

Commercial airline passengers often wish to sleep during long flights, such as trans-ocean flights. However, the seats, as well as the arrangement of seats, on a typical aircraft are configured to provide passengers with a certain amount of personal space while maximizing the total number of passengers that may be accommodated by the overall useable space in the aircraft. Therefore, the seats on a typical commercial aircraft are often closely grouped together and substantially only partially recline.

Nonetheless, certain passengers on commercial aircraft may be willing to pay a premium for the ability to sleep on a horizontal platform. Therefore, certain carriers are willing to offer such horizontal sleeping platforms. However, carriers that provide such horizontal sleeping platforms continue to seek ways to do so while minimizing the loss of useable space associated with such sleeping platforms.

Accordingly, there is a need for a berth sleeper system that can be used on commercial aircraft and that is capable of providing a horizontal sleeping platform.

SUMMARY

In one aspect, the disclosed berth sleeper system may include a platform portion and a seat portion, the seat portion defining an axis of rotation and being rotatable relative to the platform portion about the axis of rotation, wherein the seat portion includes a seat base, a backrest and a recline mechanism, the recline mechanism supporting the seat base and the backrest in an upright configuration and a horizontal configuration, wherein the seat base is substantially co-planar with the platform portion, while the backrest is disposed at an angle relative to the seat base in the upright configuration, and wherein the seat base and the backrest are substantially co-planar with the platform portion in the horizontal configuration.

In another aspect, the disclosed berth sleeper system may include a substantially flat platform portion and a seat portion positioned adjacent to the platform portion, the seat portion defining an axis of rotation and being rotatable at least about 45 degrees relative to the platform portion about the axis of rotation, wherein the seat portion includes a seat base, a backrest and a recline mechanism, the recline mechanism supporting the seat base and the backrest in an upright configuration and a horizontal configuration, wherein the seat base is substantially co-planar with the platform portion and the backrest is disposed at an angle relative to the seat base in the upright configuration, and wherein the seat base, the backrest and the platform portion define a substantially co-planar and continuous sleeping platform in the horizontal configuration.

Other aspects of the disclosed berth sleeper system will become apparent from the following description, the accompanying drawings and the appended claims.

BRIEF DESCRIPTION OF THE DRAWINGS

FIG. 5 is a front perspective view of the berth sleeper system of FIG. 1, wherein the seat portion is partially removed to show the reclining mechanism of the seat portion.

DETAILED DESCRIPTION

Figure 1:
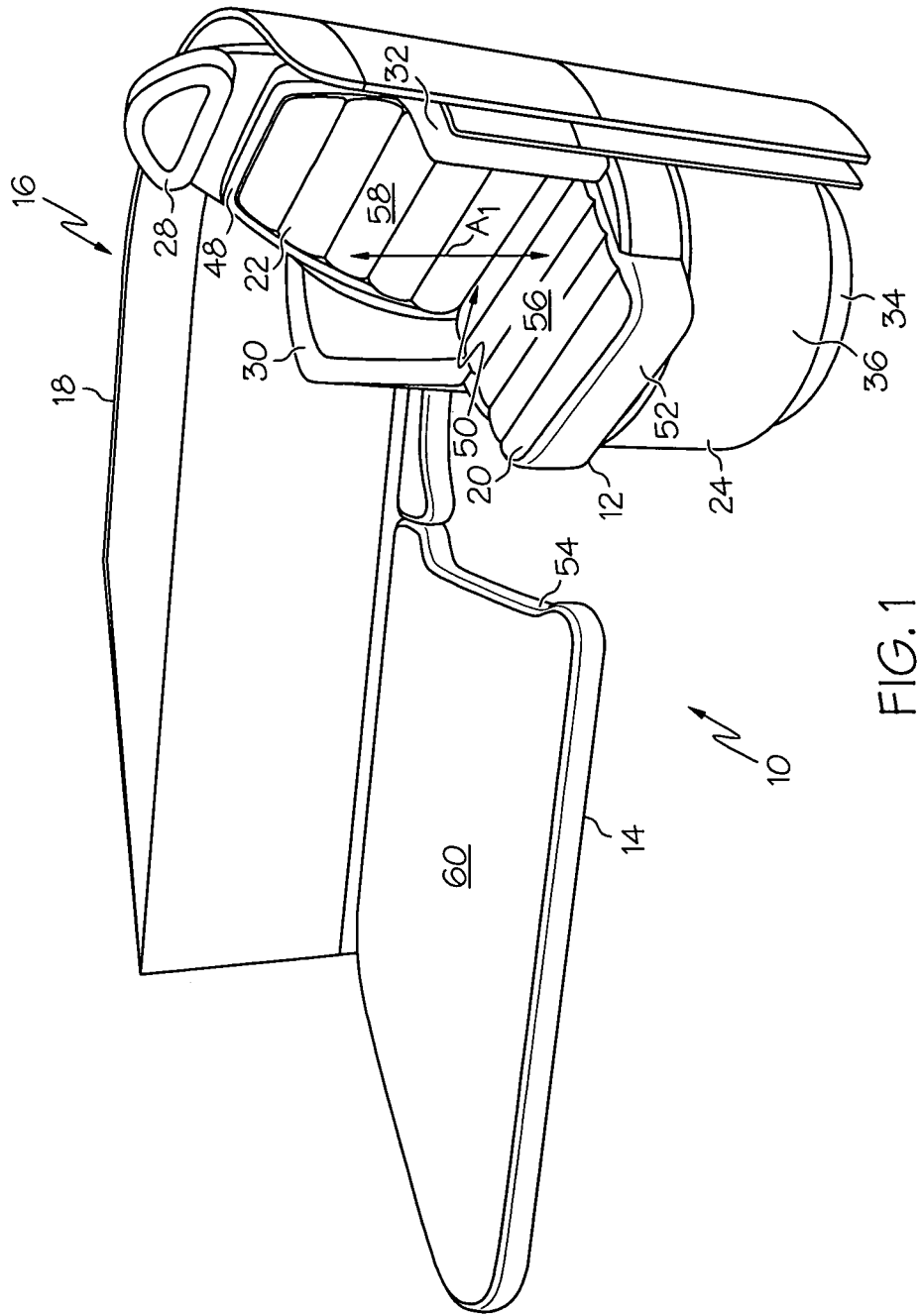
FIG. 1 is a front perspective view of one aspect of the disclosed berth sleeper system, wherein the seat portion is shown in the upright, sitting configuration.
Figure 2:
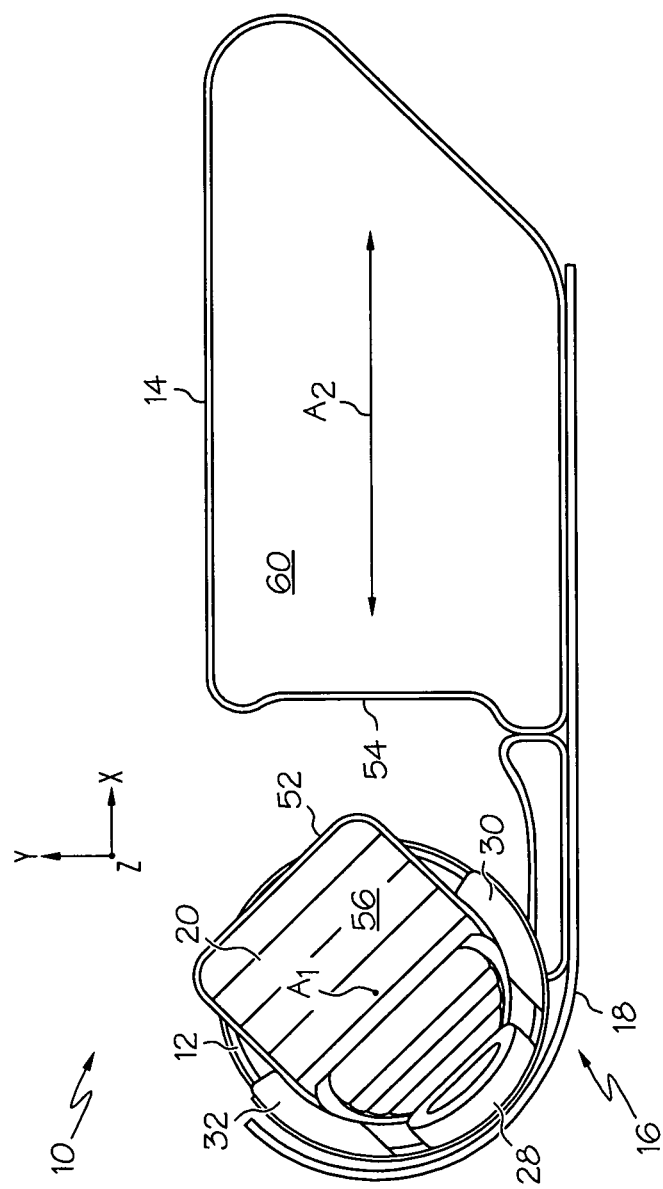
FIG. 2 is a top plan view of the berth sleeper system shown in FIG. 1.

Referring to FIGS. 1 and 2, one aspect of the disclosed berth sleeper system, generally designated 10, may include a seat portion 12 and a platform portion 14. The seat portion 12 may rotate relative to the platform portion 14 about an axis $A_1$ of rotation, which may be an axis parallel with the z-axis (FIG. 2), and may recline from an upright, sitting configuration (FIGS. 1-3) to a horizontal, sleeping configuration (FIG. 4) to form a sleeping platform.

In one aspect, the disclosed berth sleeper system 10 may be positioned in a personal sleeping compartment 16 defined by a wall 18. The personal sleeping compartment 16 may be in an aircraft (e.g., a commercial airplane), a train, a ship or an automobile. However, those skilled in the art will appreciate that the disclosed berth sleeper system 10 may be used in a variety of applications.

Still referring to FIGS. 1 and 2, the platform portion 14 of the disclosed berth sleeper system 10 may be a substantially planer platform, wherein the plane defined by the platform portion 14 may be substantially parallel with the x-y plane (FIG. 2). For example, the platform portion 14 may be a substantially flat and horizontal platform. Those skilled in the art will appreciate that the platform portion 14 may be cushioned (e.g., with foam padding and/or springs) and upholstered for comfort, as is well known in the art.

Figure 3:
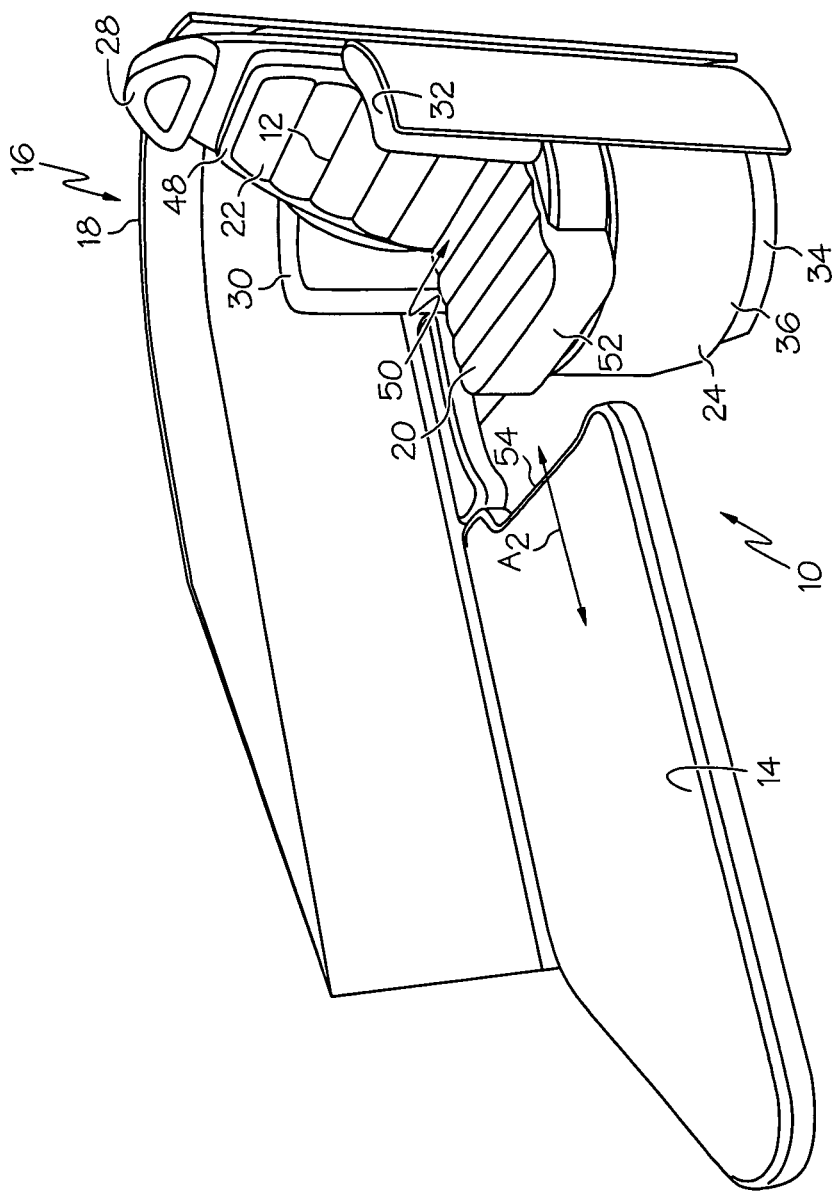
FIG. 3 is a front perspective view of the berth sleeper system of FIG. 1, wherein the seat portion has been rotated about 45 degrees from the position shown in FIG. 1.
Figure 4:
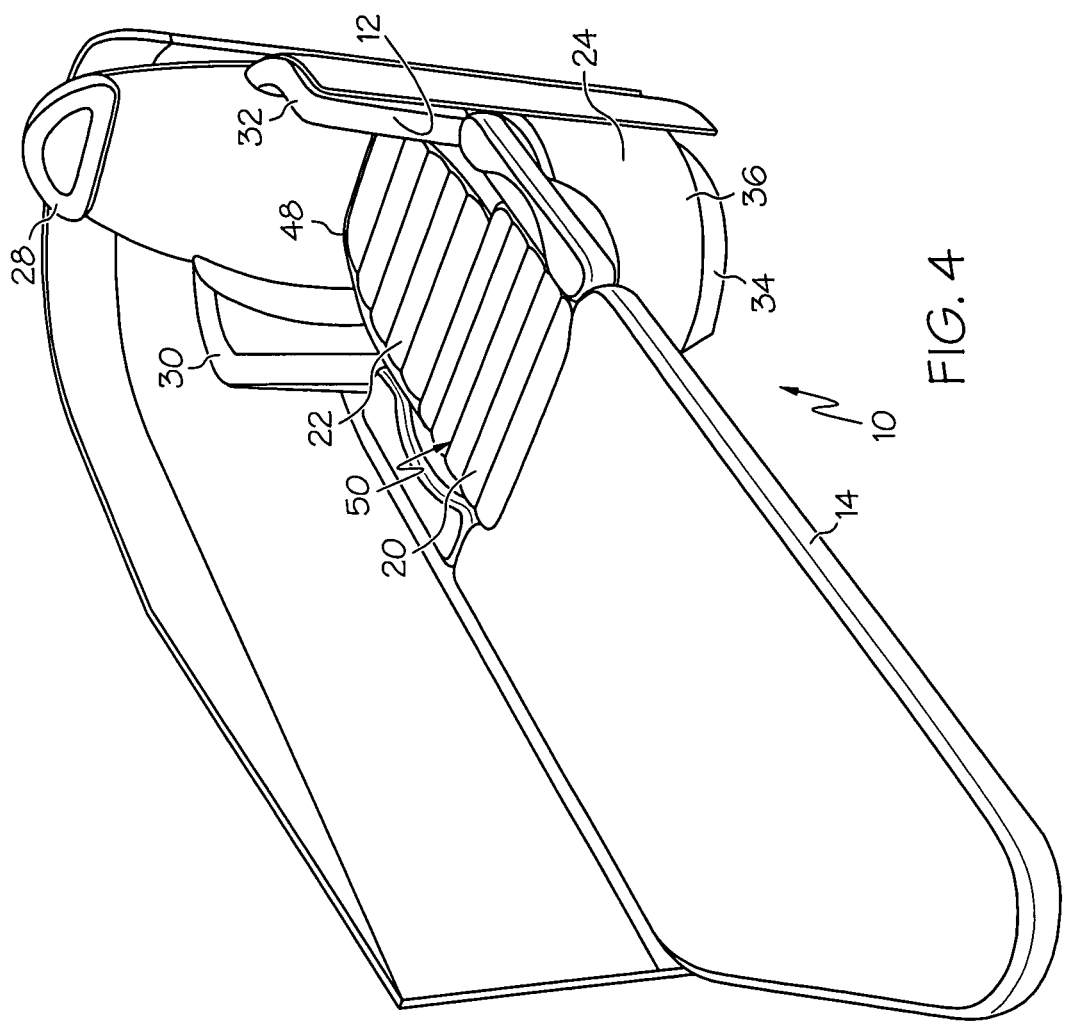
FIG. 4 is a front perspective view of the berth sleeper system of FIG. 1, wherein the seat portion is shown in the horizontal, sleeping configuration.

As shown in FIGS. 1, 3 and 4, the platform portion 14 may be positioned relative to the seat portion 12 such that the platform portion 14 is substantially co-planar with the seat base 20 (discussed below) of the seat portion 12. For example, when the seat base 20 of the seat portion 12 is raised about 20 inches from the sub-structure (not shown) supporting the seat portion 12, the platform portion 14 may be elevated about 20 inches from the sub-structure. Exemplary techniques for elevating the platform portion 14 relative to the sub-structure include the use of a support structure (not shown) to raise the platform portion 14 and connecting the platform portion 14 to the wall 18 of the personal sleeping compartment 16.

Referring to FIG. 2, the platform portion 14 may have various shapes in top view to accommodate the shape of the personal sleeping compartment 16. Furthermore, the platform portion 14 may be sufficiently elongated along a platform axis $A_2$ to accommodate a substantial portion of a prone human. For example, the platform portion 14 may have a length (in the direction parallel with the platform axis $A_2$) of about 3 to about 5 feet.

Referring again to FIGS. 1 and 2, the seat portion 12 of the berth sleeper system 10 may include a seat base 20, a backrest 22, a support structure 24 and a recline mechanism 26 (FIG. 5). In one optional aspect, the seat portion 12 may additionally include a headrest 28. In another optional aspect, the seat portion 12 may additionally include armrests 30, 32. In yet another optional aspect, the seat portion 12 may additionally include both the headrest 28 and the armrests 30, 32. Those skilled in the art will appreciate that the seat base 20 and the backrest 22 of the seat portion 12, as well as the optional headrest 28 and the armrests 30, 32, may be cushioned (e.g., with foam padding and/or springs) and upholstered for comfort, as is well known in the art.

The support structure 24 may be secured to a sub-structure, such as a floor or the ground, and may rotatably support the seat portion 12 relative to the sub-structure such that the seat portion 12 is rotatable relative to the platform portion 14 about the axis $A_1$ of rotation. In one exemplary aspect, the seat portion 12 may rotate about 45 degrees relative to the platform portion 14. For example, FIG. 4 shows the seat portion 12 aligned with the platform portion 14 (i.e., zero degrees of rotation) and FIG. 1 shows the seat portion 12 rotated about 45 degrees from the platform portion 14. In another exemplary aspect, the seat portion 12 may rotate 360 degrees about the axis $A_1$ of rotation.

Referring to FIG. 1, in one particular aspect, the support structure 24 may include a base 34 secured to the sub-structure and a mount 36 to which the seat base 20 and the backrest 22 may be secured. The mount 36 may be rotatably connected to the base 34 to define a swivel connection therebetween. Roller bearings (not shown) or the like may be provided to facilitate low-friction rotation of the mount 36 (and associated components of the seat portion 12) relative to the base 34.

The recline mechanism 26 (FIG. 5) may be any mechanism that facilitates movement of the seat base 20 and the backrest 22 from the upright, sitting configuration shown in FIGS. 1-3 to the horizontal, sleeping configuration shown in FIG. 4. Those skilled in the art will appreciate that the recline mechanism 26 may be a mechanical mechanism, an electromechanical mechanism or the like.

In the upright, sitting configuration shown in FIGS. 1-3, the seat base 20 of the seat portion 12 may be substantially co-planar with the platform portion 14, while the backrest 22 of the seat portion 12 may be disposed at an angle (e.g., about 10 to about 90 degrees) relative to the seat base 20. In one aspect, as shown in FIG. 3, a minimum spacing may be provided between the distal portion 52 of the seat base 20 and the proximal portion 54 of the platform portion 14 to provide legroom therebetween. For example, a minimum spacing of about 8 to about 14 inches may be provided between the distal portion 52 of the seat base 20 and the proximal portion 54 of the platform portion 14 when the seat portion 12 is in the upright, sitting configuration.

In the horizontal, sleeping configuration shown in FIG. 4, both the seat base 20 and the backrest 22 of the seat portion 12 may be substantially co-planar with the platform portion 14. Furthermore, in the horizontal, sleeping configuration, the spacing between the distal portion 52 of the seat base 20 and the proximal portion 54 of the platform portion 14 may be minimized (e.g., at most about 2 inches), thereby providing a substantially continuous sleeping platform comprised of both the platform portion 14 and the seat portion 12.

Referring to FIGS. 1 and 2, those skilled in the art will appreciate that reference to the seat base 20 and the backrest 22 being substantially co-planar with the platform portion 14 may optionally refer to the upper surfaces 56, 58 of the seat base 20 and the backrest 22 being substantially co-planar with the upper surface 60 of the platform portion 14. Furthermore, those skilled in the art will appreciate that a substantially co-planar sleeping platform is desired to improve comfort and, therefore, two planes displaced by up to about 3 inches may still be regarded as "substantially co-planar."

Referring to FIG. 5, in one exemplary aspect, the recline mechanism 26 may include an electric motor 38, two drawer slides 40, 42, a linear drive 44 and a roller track 46. The top portion 48 (FIG. 1) of the backrest 22 may be moveably connected to the roller track 46 such that the backrest 22 can recline from the upright configuration to the fully reclined configuration by traveling along the roller track 46. The seat base, for example the rear portion 50 (FIG. 1) of the seat base 20, may be connected to the linear drive 44 such that the linear drive 44 may urge the seat base 20 in the proximal and distal directions (i.e., along axis $A_2$). Furthermore, the seat base 20 may be secured to and supported by the drawer slides 40, 42.

Thus, when the electric motor 38 is actuated, the linear drive 44 may urge the seat base 20 in the distal direction (e.g., along axis $A_2$ toward the proximal end 54 of the platform portion 14). While the seat base 20 is distally advancing, the backrest 22, which may be hingedly connected to the seat base 20 or independent of the seat base 20, may travel along the roller track 46 until the backrest 22 is substantially co-planar with the seat base 20 and the platform portion 14. Of course, the process may be reversed by reversing the direction of travel of the linear drive 44, thereby returning the seat portion 12 to the upright, sitting configuration.

Accordingly, the disclosed berth sleeper system 10 may include a seat portion 12 that rotates relative to a platform portion 14 about an axis $A_1$ of rotation, wherein the seat portion 12 is reclineable such that the seat base 20 and the backrest 22 of the seat portion 12 are aligned and substantially co-planar with the platform portion 14 to form a substantially continuous sleeping platform.

Although various aspects of the disclosed berth sleeper system have been shown and described, modifications may occur to those skilled in the art upon reading the specification. The present application includes such modifications and is limited only by the scope of the claims.

What is claimed is:

1. A berth sleeper system comprising:
  a platform portion;
  a seat portion, said seat portion including a support structure, said support structure having a base secured to a sub-structure and a mount rotatably connected to said base to define a swivel connection therebetween and further defining an axis of rotation such that said mount is rotatable relative to said platform portion about said axis of rotation, said seat portion further including a seat base and a backrest having a top portion, said seat portion further including a recline mechanism attached to said support structure, said recline mechanism supporting said seat base and said backrest in an upright configuration and a horizontal configuration, wherein said seat base and said backrest are moved by said recline mechanism toward said platform when said seat base and said backrest are moved from said upright configuration to said horizontal configuration, and wherein said seat base, said backrest and said recline mechanism are rotatable relative to said base and said platform portion;
  wherein said seat base is substantially co-planar with said platform portion, while said backrest is disposed at an angle relative to said seat base in said upright configuration, and wherein said seat base and said backrest are substantially co-planar with said platform portion in said horizontal configuration;
  said seat portion having a seat base with a distal portion, and said platform portion having a proximal portion spaced from said distal portion when said backrest is disposed in said upright configuration, such that said seat base and said backrest can be placed in said horizontal configuration to extend between said platform and said support structure, wherein said seat base is adjacent said platform and said top portion of said backrest is adjacent said recline mechanism and said support structure; and wherein said top portion of said backrest is directly connected to said recline mechanism.

2. The berth sleeper system of claim 1, further comprising a wall defining a personal sleeping compartment, wherein said platform portion and said seat portion are positioned in said personal sleeping compartment.

3. The berth sleeper system of claim 1, wherein said platform portion is substantially flat.

4. The berth sleeper system of claim 1, wherein said platform portion includes cushioning.

5. The berth sleeper system of claim 1, wherein said platform portion has a length of about 3 feet to about 5 feet.

6. The berth sleeper system of claim 1, wherein said seat portion further includes a headrest, and at least one armrest.

7. The berth sleeper system of claim 1, wherein said seat portion further includes a support structure that elevates said seat base from said sub-structure, wherein said support structure defines a swivel connection with said sub-structure.

8. The berth sleeper system of claim 1, wherein said seat base and said backrest include cushioning.

9. The berth sleeper system of claim 1, wherein said seat portion is rotatable about 45 degrees relative to said platform portion.

10. The berth sleeper system of claim 1, wherein a distance between said distal end and said proximal end is about 8 inches to about 14 inches when said seat portion is in said upright configuration and aligned with said platform portion.

11. The berth sleeper system of claim 10, wherein said distance is at most about 2 inches when said seat portion is in said horizontal configuration.

12. The berth sleeper system of claim 1, wherein said recline mechanism includes a linear drive connected to said seat base.

13. The berth sleeper system of claim 12, wherein said recline mechanism further includes an electric motor coupled to said linear drive.

14. The berth sleeper system of claim 1, wherein said recline mechanism includes a roller track and said backrest is moveably connected to said roller track.

15. The berth sleeper system of claim 1, wherein said seat base, said backrest and said platform portion define a substantially continuous sleeping platform when said seat portion is in said horizontal configuration.

16. A berth sleeper system comprising:
a substantially flat platform portion;
a seat portion positioned adjacent said platform portion, said seat portion including a support structure, said support structure having a base secured to a sub-structure and a mount rotatably connected to said base to define a swivel connection therebetween and defining an axis of rotation rotatable at least about 45 degrees relative to said platform portion about said axis of rotation, said seat portion further including a seat base and a backrest having a top portion, said seat portion further including a recline mechanism attached to said support structure and to said top portion, said recline mechanism including a roller track extending parallel to said axis of rotation and a top portion of said backrest being movably connected to said roller track, said recline mechanism supporting said seat base and said backrest in an upright configuration, and a horizontal configuration wherein said seat base and said backrest are moved by said recline mechanism toward said platform when said seat base and said backrest are moved from said upright configuration to said horizontal configuration, and wherein said seat base, said backrest and said recline mechanism are rotatable relative to said base and said platform portion, said backrest reclining from said upright configuration to said fully reclined configuration by traveling along said roller track;

wherein said seat base is substantially co-planar with said platform portion and said backrest is disposed at an angle relative to said seat base in said upright configuration, and wherein said seat base, said backrest and said platform portion define a substantially co-planar and continuous sleeping platform in said horizontal configuration; and said seat portion having a seat base with a distal portion, and said platform portion having a proximal portion spaced from said distal portion when said backrest is disposed in said upright configuration, such that said seat base and said backrest can be placed in said horizontal configuration such that said seat portion and said backrest extend between said platform and said support structure, wherein said seat base is adjacent said platform and said top portion of said backrest is adjacent said recline mechanism and said support structure.

17. The berth sleeper system of claim 16, wherein said support structure is configured to elevate said seat base from the sub-structure, wherein said support structure defines a swivel connection with said sub-structure.

18. The berth sleeper system of claim 16, wherein a distance between said distal end and said proximal end is about 8 inches to about 14 inches when said seat portion is in said upright configuration and aligned with said platform portion; and wherein said distance is at most about 2 inches when said seat portion is in said horizontal configuration.

19. The berth sleeper system of claim 16, wherein said recline mechanism further comprises a linear drive and at least one drawer slide, wherein said seat base is connected to said linear drive such that said linear drive urges said seat base in proximal and distal directions relative to said platform.

* * * * *